United States Patent
Stucky

(10) Patent No.: US 12,415,567 B2
(45) Date of Patent: Sep. 16, 2025

(54) STAND-ON TERRAIN WORKING VEHICLE PROPULSION CONTROL SYSTEM

(71) Applicant: Excel Industries, Inc., Hesston, KS (US)

(72) Inventor: Jacob Stucky, Sedgwick, KS (US)

(73) Assignee: Excel Industries, Inc., Hesston, KS (US)

( * ) Notice: Subject to any disclaimer, the term of this patent is extended or adjusted under 35 U.S.C. 154(b) by 533 days.

(21) Appl. No.: 17/965,412

(22) Filed: Oct. 13, 2022

(65) Prior Publication Data

US 2023/0116081 A1    Apr. 13, 2023

Related U.S. Application Data

(60) Provisional application No. 63/255,115, filed on Oct. 13, 2021.

(51) Int. Cl.
| | | |
|---|---|---|
| *B62D 51/00* | (2006.01) | |
| *B62D 11/06* | (2006.01) | |
| *B62D 51/02* | (2006.01) | |
| *A01D 34/64* | (2006.01) | |
| *A01D 34/82* | (2006.01) | |
| *A01D 101/00* | (2006.01) | |

(52) U.S. Cl.
CPC ............ *B62D 11/06* (2013.01); *B62D 51/002* (2013.01); *B62D 51/02* (2013.01); *A01D 34/64* (2013.01); *A01D 34/828* (2013.01); *A01D 2101/00* (2013.01)

(58) Field of Classification Search
CPC .......... B62D 51/002; B62D 1/14; B62D 1/12; B62D 51/02; E05B 15/0053
See application file for complete search history.

(56) References Cited

U.S. PATENT DOCUMENTS

| | | | | |
|---|---|---|---|---|
| 5,020,308 | A * | 6/1991 | Braun ................... | B62D 51/002 56/11.5 |
| 10,696,260 | B2 * | 6/2020 | Mayefske ............. | B60R 21/131 |
| 11,285,986 | B1 * | 3/2022 | Scott .................... | A01D 34/824 |

(Continued)

FOREIGN PATENT DOCUMENTS

| | | | | |
|---|---|---|---|---|
| EP | 1955580 A1 * | 8/2008 | ............. | A01D 34/69 |
| FR | 2865723 A1 * | 8/2005 | ............. | B62B 5/06 |
| GB | 2410228 A * | 7/2005 | ............. | B62B 5/06 |

*Primary Examiner* — Jason D Shanske
*Assistant Examiner* — Maxwell L Meshaka
(74) *Attorney, Agent, or Firm* — Shook, Hardy & Bacon L.L.P.

(57) ABSTRACT

A stand-on terrain working vehicle may include a control tower coupled to a frame, a steering lever coupled to the control tower and configured to move between a first position and a second position, a blocking bar coupled to the control tower and configured to move between a blocking position and an unblocking position, where the blocking bar in the blocking position limits movement of the steering lever to movement from the first position to an intermediate position between the first and second position, and where the blocking bar in the unblocking position does not limit movement of the steering lever between the first position and the second position. A locking bar may be coupled to the blocking bar and a locking bracket may be coupled to the control tower, where the locking bar and the locking bracket may act to hold the blocking bar in a desired position.

18 Claims, 4 Drawing Sheets

(56) References Cited

U.S. PATENT DOCUMENTS

| | | | | |
|---|---|---|---|---|
| 11,950,536 | B2* | 4/2024 | Teraoka | A01D 75/28 |
| 11,981,234 | B2* | 5/2024 | Aldridge | A01D 67/04 |
| 2003/0066380 | A1* | 4/2003 | Cheng | B62D 1/184 |
| | | | | 74/556 |
| 2019/0126876 | A1* | 5/2019 | Mayefske | B60R 21/131 |
| 2021/0378171 | A1* | 12/2021 | Barber | B60K 31/00 |
| 2022/0169299 | A1* | 6/2022 | Scott | A01D 34/824 |
| 2022/0192097 | A1* | 6/2022 | Teraoka | A01D 75/28 |
| 2022/0227262 | A1* | 7/2022 | Aldridge | B60N 2/06 |
| 2023/0116081 | A1* | 4/2023 | Stucky | B62D 1/12 |
| | | | | 180/6.2 |
| 2024/0206381 | A1* | 6/2024 | Barber | A01D 34/008 |
| 2024/0397857 | A1* | 12/2024 | Park | A01D 34/64 |

\* cited by examiner

STAND-ON TERRAIN WORKING VEHICLE PROPULSION CONTROL SYSTEM

CROSS-REFERENCE TO RELATED APPLICATIONS

This application entitled "Stand-on Terrain Working Vehicle Propulsion Control System," claims the benefit of and priority to U.S. Provisional Application 63/255,115, filed Oct. 13, 2021, entitled "Stand-on Terrain Working Vehicle Propulsion Control System." The entirety of the aforementioned application is incorporated by reference herein.

FIELD

Aspects provided relate to a stand-on terrain working vehicle propulsion control system.

SUMMARY

A stand-on terrain working vehicle may be operated over a variety of terrain types (e.g., flat, uneven, hillside, etc.) to perform a variety of operations (e.g., back and forth hi-speed maneuvering, tight handling low-speed maneuvering, etc.). Thus, depending on several factors (e.g., terrain type, operation type, operator experience, etc.) it may be preferable to operate the stand-on terrain working vehicle at full speed. In other circumstances, however, it may be preferable to operate the stand-on terrain working vehicle at less than full speed. In the past, a vehicle may have been operated at less than full speed by manipulating the propulsion controls manually (e.g., an operator would hold the control inputs at a desired position and try to not exceed that position during operation). Recently, several attempts have been made to provide a speed limiting system that physically blocks the propulsion controls from exceeding a predetermined speed. These attempts have suffered, however, from having a speed limiting system that can only be adjusted when the vehicle is not being operated (e.g., turned off, returned to neutral drive condition, etc.). Thus, on-the-fly changes to the speed limiting system (e.g., engaging the speed limiting system or disengaging the speed limiting system while driving the vehicle) were not possible. As a result, previous speed limiting systems were not widely adopted and not used even where adopted because of the resultant inefficiencies of engaging and disengaging said systems.

An aspect of a stand-on terrain working vehicle described herein may include a control tower, one or more steering levers pivotally coupled to the control tower, and a blocking bar pivotally coupled to the control tower. The one or more steering levers may be configured for controlling propulsion of the vehicle. The blocking bar may be configured for moving between a blocking position, where the blocking bar presents a physical obstruction to limit movement of the one or more steering levers, and an unblocking position, where the blocking bar does not present a physical obstruction to limit movement of the one or more steering levers. Aspects may include a locking bracket coupled to the control tower and a locking bar pivotally coupled to the blocking bar. The locking bracket may include a first engagement portion and a second engagement portion. The locking bar may be configured to selectively engage one of the first engagement portion and the second engagement portion to hold the blocking bar in the blocking position or the unblocking position.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
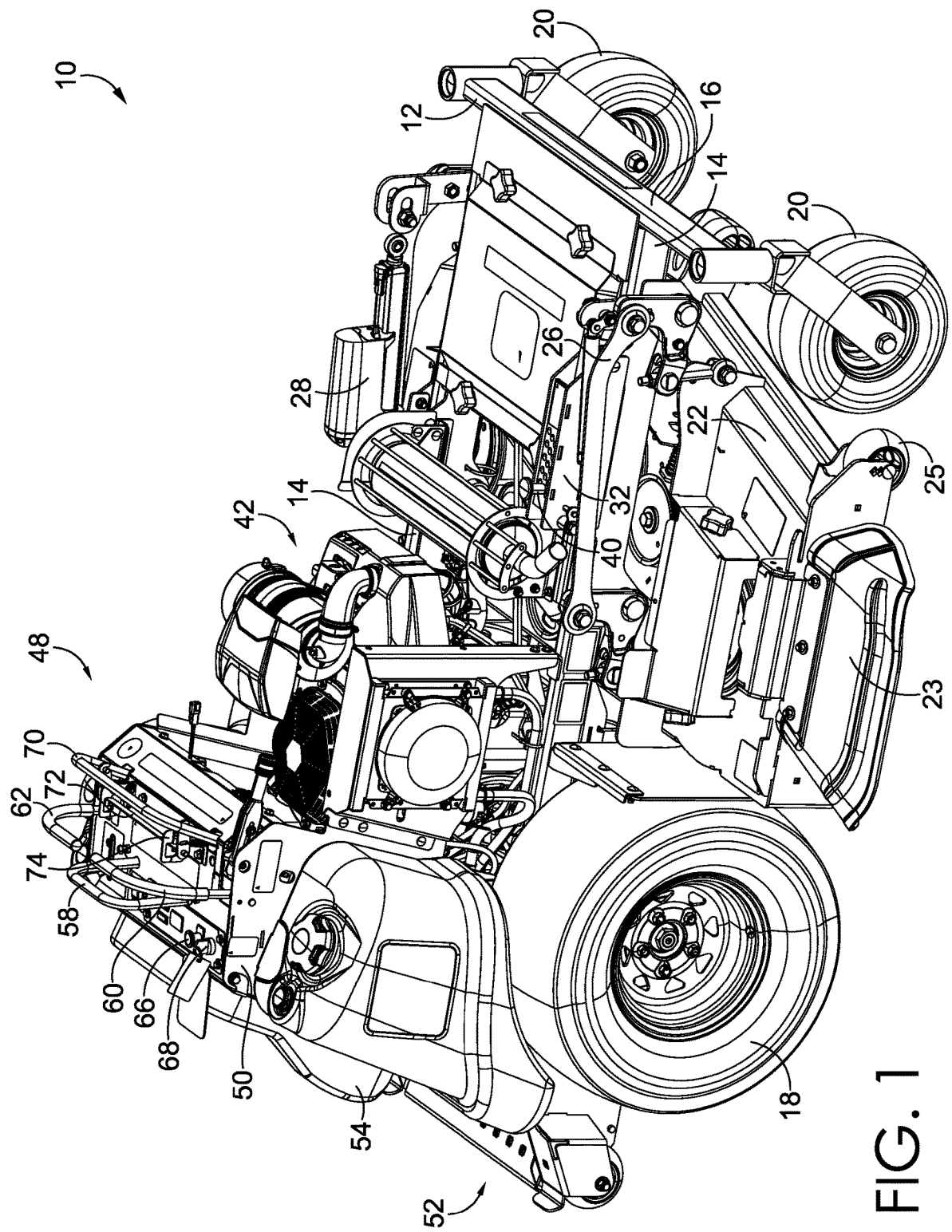
FIG. 1 depicts a perspective view of a terrain working vehicle, in accordance with aspects hereof.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other present or future technologies. Further, it should be appreciated that the figures do not necessarily represent an all-inclusive representation of the embodiments herein and may have various components hidden to aid in the written description thereof.

At a high level, a stand-on terrain working vehicle may include a control tower, one or more steering levers pivotally coupled to the control tower, and a blocking bar pivotally coupled to the control tower. The one or more steering levers may be configured for controlling propulsion of the vehicle. The blocking bar may be configured for moving between a blocking position, where the blocking bar presents a physical obstruction to limit movement of the one or more steering levers, and an unblocking position, where the blocking bar does not present a physical obstruction to limit movement of the one or more steering levers. Aspects may include a locking bracket coupled to the control tower and a locking bar pivotally coupled to the blocking bar. The locking bracket may include a first engagement portion and a second engagement portion. The locking bar may be configured to selectively engage one of the first engagement portion and the second engagement portion to hold the blocking bar in the blocking position or the unblocking position.

Aspects hereof may be described using directional terminology. For example, the Cartesian coordinate system may be used to describe positions and movement or rotation of the features described herein. Accordingly, some aspects may be described with reference to three orthogonal axes.

The axes may be referred to herein as lateral, longitudinal, and vertical, and may be indicated by reference characters X, Y, and Z, respectively, in the accompanying figures. For example, the lateral axis may be associated with a side-to-side direction of a vehicle, the longitudinal axis may be associated with a front-to-back direction of the vehicle, and the vertical axis may be associated with a bottom-to-top direction of the vehicle. Additionally, relative location terminology will be utilized herein. For example, the term "proximate" is intended to mean on, about, near, by, next to, at, and the like. Therefore, when a feature is proximate another feature, it is close in proximity but not necessarily exactly at the described location, in some aspects. Additionally, the term "distal" refers to a portion of a feature herein that is positioned away from a midpoint of the feature.

A stand-on terrain working vehicle (a "STV") comprises various structures and on-board systems mounted to those structures. At a basic level, a STV will have a frame and wheels coupled to the frame. The frame may comprise stamped sheet metal, tube rails, plates, platforms, rods, tubes, shafts, beams, channels, and other components coupled to one another. These components of the frame may be welded to one another, fastened together with hardware, or otherwise coupled to one another. The wheels carry the frame above a terrain surface. Typically a STV will have one or more drive wheels and one or more non-drive wheels. For example, a STV may include a pair or rear drive wheels and one or more front wheels. The pair of rear drive wheels of this example may be operably coupled to a propulsion system of the STV while the one or more front wheels may not be coupled to the propulsion system. In aspects, the one or more front wheels may not comprise wheels and may instead comprise casters. Some STVs may include independently driven drive wheels, which can provide the STV with a zero-degree turning radius ("ZTR").

STVs may comprise vehicles in which an operator stands-on the STV. STVs may include a control tower affixed to the frame and which extends upwardly therefrom. The control tower may include controls (e.g., propulsion control, implement control, steering control, etc.) and/or systems (e.g., operator presence system, etc.) mounted thereon. For example, the control tower may include a steering control such as a steering wheel and may also include a propulsion control such as a throttle control. In other aspects, the propulsion and steering of the STV may be controlled simultaneously. For example, with a pair of steering levers that each independently operate one of a pair of drive wheels, such as in the case of a ZTR vehicle. Typically, a STV includes an operator platform upon which the operator may stand that is positioned rearward of the control tower (e.g., the operator platform may be positioned proximate a rear end of the STV). The operator platform may comprise a portion of the frame or another structure coupled to the frame, in some aspects. In other aspects, the operator platform may be towed behind the STV.

STVs also include a power supply. In some aspects, the power is supplied from an internal combustion engine. In other aspects, power may be supplied from one or more batteries. In some aspects, the one or more batteries may comprise lead-acid batteries. In other aspects, the one or more batteries may comprise lithium-ion batteries. Other types of batteries now known or later developed may also be used without departing from the scope of the invention described herein. The power supply may be coupled to any portion of the frame. In STVs, the power supply may be mounted on the frame forward of the control tower. The power supply may be configured to provide power to various systems (e.g., a propulsion system, a steering control system, etc.) and features (e.g., headlamps, an implement, etc.) of the STV.

STVs also include one or more terrain working implements. An implement may be powered (e.g., a cutting deck and cutting blades of a mower, a blower, etc.) or non-powered (e.g., a blade, a broom, etc.). The implement may be coupled to the frame. In aspects, the implement may be removably coupled to the frame. In further aspects, the implement may be adjustable relative to the frame such that the implement may move between different positions relative to the frame. Powered implements may be driven by the power supply mounted to the frame of the STV (e.g., belt and chain drives coupled to an internal combustion engine) or by a prime mover mounted to the implement itself (e.g., a motor electrically coupled to the power supply). In aspects, the powered implements receive power from the power supply. For example, one or more motors may be coupled to the implement to drive the implement and may receive power from the power supply.

A propulsion system may be configured to provide propulsion to the STV. For example, STVs may be driven by an operator. In some aspects, the propulsion system of the STV may comprise an engine, a mechanical transmission or a hydrostatic transmission coupled to a drive wheel. In other aspects, the propulsion system of the STV may comprise a motor coupled to a drive wheel. The motor may be directly coupled to the drive wheel or may be indirectly coupled to the drive wheel (e.g., via one or more gears, via a transaxle, via another transmission component, etc.). In some aspects, the STV includes more than one motor or transmission (e.g., hydrostatic transmission). For example, in a ZTR STV, there may be two motors coupled independently to two drive wheels. In still other aspects, the STV may have motors coupled to more than two wheels or to all of the wheels. In these aspects the motors may work independently or in conjunction to drive the vehicle. Likewise, a transmission system (e.g., hydrostatic or mechanical) may be coupled to two wheels or any number of the wheels and may work independently or in conjunction to drive the vehicle. The motor or transmission is, or the motors or transmissions are, operatively coupled with the power supply. Propulsion of the STV may thus be controlled by selectively supplying power to the motor(s) or transmission(s). In accordance with aspects, the motors may comprise a direct current motors such that inverting the supply of power changes the direction of propulsion (e.g., forward or rearward propulsion).

The amount of power supplied to motor or transmission, and thus the amount of propulsion generated, may be controlled by a propulsion control positioned within reach of an operator of the STV (e.g., on the control tower). In aspects, the propulsion may be statically set such that a speed is selected by the operator and the STV is provided the associated amount of power to maintain the selected speed. In other aspects, the propulsion may be dynamically controlled such that speed may vary during operation of the STV as adjusted by the operator. Dynamic control of propulsion may be achieved with propulsion input devices that move relative to a portion of the STV (e.g., the frame, the operator handle, the control tower, etc.). Examples of propulsion input devices include throttle controls (e.g., such as those typically associated with motorcycles), joysticks, pivot rods, steering levers, etc. Movement of the propulsion input device causes power to be supplied to the motor or transmission and causes propulsion of the STV. In some aspects, the propulsion input devices are mechanically connected to a throttle control of an engine by a link, a linkage, or a push-pull cable apparatus. In other aspects, the propulsion input devices are mechanically connected to swash plate control of a hydrostatic pump and transmission system by a link, a linkage, or a push-pull cable apparatus. In still other aspects, the movement of the input devices may be measured by a sensor (position measuring device) and a signal may be communicated to a control system that instructs the associated supply of power be provided to an electric drive motor, in accordance with some aspects. In other aspects, the movement may directly or indirectly operate a switch connected to a circuit that supplies power to such a motor.

In some aspects, a steering control may be independent of the propulsion control. For example, the STV may include a steering wheel or other steering input that controls the direction the vehicle moves when propulsion is supplied. In such aspects, the steering control may be mechanically coupled to one or more wheels, which turn in response to adjustment of the steering control. In other aspects, the steering control may be electrically coupled to an actuator that turns a wheel in response to adjustment of the steering control. Further aspects may include additional actuators that turn additional wheels. The actuators may comprise electric actuators operatively coupled to the power supply, hydraulic actuators, or other types of actuators. As with the propulsion system, movement of the steering input may be measured by a sensor and a signal may be communicated to a control system that instructs the associated movement of the wheel. Similarly, movement of the steering input may directly or indirectly operate a switch connected to a circuit that supplies power to the actuators. As discussed above, the propulsion control and the steering control may be integrated in some aspects. For example, ZTR STVs may independently control drive wheels such that drive wheels turning at different speeds will change the direction of the propelled vehicle.

Some aspects of STVs may include a control system for controlling various systems and features. The control system may receive signals from sensors distributed about the STV and instruct various commands in response to the received signals, in some aspects. Alternatively, or additionally, the control system may monitor electric circuits for a change in voltage and/or current and instruct various commands in response to monitored changes in voltage and/or current, in other aspects. The control system may comprise a central control system receiving signals and/or monitoring inputs from distributed sensors and systems. The control system may alternatively comprise a distributed control system where various controllers are associated with individual sensors and systems for controlling only a single or a few systems or features of the STV. For example, each motor may have an independent controller dedicated to receiving signals from sensors associated with a steering input and a propulsion input associated with such motor and dedicated to controlling power supplied to such motor in response to the received signals.

In some aspects, a parking brake may be coupled to, or integrated with, the STV. The parking brake may be mechanically set or electrically set. For example, a foot pedal or lever, or a hand lever, may actuate the parking brake via a linkage and/or a push-pull cable, a cam, or some other mechanical coupling. By way of another example, an actuator may actuate the parking brake in response to instructions from the control system and/or an electric signal received or monitored.

Some parking brakes may inhibit rotation, resist rotation, and/or prevent rotation of an output shaft of the motor, a gear, a transaxle, an intermediate shaft, or the drive shaft. A frictional force may be applied by pressing a first portion of the parking brake that does not rotate (e.g., a caliper, a brake pad, a brake shoe, etc.) against a second portion of the parking brake that does rotate (e.g., a brake rotor, a brake drum, etc.).

Operator presence systems ("OPS") may be included in STVs to detect the presence of the operator. OPS generally include a member configured to move in response to the presence of an operator. In response to movement of the member a sensor configured to detect such movement sends a signal to the control system, in some aspects. In other aspects, movement of the member directly or indirectly actuates a switch connected to an electric circuit. In these aspects, the control system may monitor a voltage and/or a current of the electric circuit. In response to the received signal from the sensor or from a change in monitored voltage and/or current, the control system may instruct various systems to initiate action, continue action, discontinue action, engage, disengage, actuate, etc. For example, when the control system determines presence of the operator, it may then instruct a parking brake to disengage. Likewise, when the control system determines absence of the operator, it may then instruct the parking brake to engage. The control system may also control other systems and features of the STV based on a sensed or monitored OPS. For example, the implement, propulsion, steering and other systems may be controlled in this way.

In the figures that follow, the STV will be described in reference to a particular embodiment of a zero-turn stand-on mower. However, the illustrated embodiment is merely one aspect of the present invention, which may be employed on numerous other types of vehicles (e.g., a snow thrower, a non-zero turn mower, etc.).

Turning now to the figures generally, and in particular to FIG. 1, a zero-turn, stand-on mower 10 is depicted. The mower 10 includes a frame 12. The frame 12 generally includes a pair of frame rails 14 spaced apart in the lateral direction and extending in the longitudinal direction of the mower 10. The frame rails 14 are connected by cross-members 16. The cross-members 16 may comprise cross-beams, cross-tubes, plates, rods, shafts, or other structures that extend from one frame rail 14 to the other frame rail 14. The cross-members 16 may be welded, fastened or otherwise rigidly attached to the frame rails 14. In other aspects, the cross-members 16 may be integral to the frame rails 14.

The frame 12 is carried over a terrain surface by a pair of drive wheels 18 and a pair of front wheels 20. The pair of drive wheels 18 are each independently driven by a propulsion system. The pair of front wheels 20 are not driven by the propulsion system.

Coupled to the frame 12 is a cutting deck 22. The illustrated cutting deck 22 includes two blades (not shown), each independently driven by a deck motor 24. Other aspects may include more or fewer blades. Coupled to the cutting deck 22 is a discharge chute 23. The discharge chute 23 is configured for side discharge of clippings. In other aspects, the discharge chute may comprise a rear discharge chute that is configured for rear discharge of clippings (e.g., rearwardly between the wheels, rearwardly outside one or both of the wheels, etc.). The cutting deck 22 may also include one or more anti-scalp wheels 25, which may be configured to provide an even cut on an uneven terrain surface.

The cutting deck 22 is coupled to the frame 12 by a height adjustment linkage 26. The height adjustment linkage 26 is configured to raise and lower the cutting deck 22 relative to the frame 12 in the vertical direction. In this way, the mower 10 may cut grass at selectable heights above the terrain surface. The height adjustment linkage 26 may be actuated with a height adjustment linkage actuator 28 coupled to the height adjustment linkage 26. In some aspects, the height adjustment linkage 26 may be actuated manually by a hand lever. When the height adjustment linkage actuator 28 is actuated the height adjustment linkage 26 moves and results in the cutting deck 22 moving in the vertical direction. The height adjustment linkage 26 may be held in a desired position with a height lock 32. A locking pin 40 may hold the height adjustment linkage 26 and cutting deck 22, at the desired position.

The mower 10 also includes a power supply. The power supply includes an internal combustion engine 42. Power from the internal combustion engine 42 is used to generate electrical power for various electrical components of the mower 10 (e.g., sensors, operator presence system, lights, control inputs, switches, etc.). Power from the internal combustion engine 42 is also transferred by a belt and pulley system to the cutting deck 22 to drive the cutting blades. Power from the internal combustion engine 42 is also used to provide propulsion to the mower 10. In the illustrated mower 10, a pair of independent hydrostatic drive units are coupled to the drive wheels 18. The hydrostatic drive units include a hydrostatic pump and a hydrostatic motor. Power from the internal combustion engine 42 is supplied to the hydrostatic pump, which is used to drive the hydrostatic motor. In alternative aspects, the power supply may comprise one or more batteries that provide power to the electrical components of the mower 10, power drive motors coupled to the drive wheels 18, and power blade motors coupled to the cutting deck 22.

Rearward of the power supply is a control tower 48. The control tower 48 is coupled to the frame 12 and extends vertically therefrom. The control tower 48 illustrated in FIG. 1 comprises a plate assembly 50 each coupled to the frame 12 at the frame rails 14. The plate assembly 50 may comprise one or more plates coupled together (e.g., welded, fastened, etc.). In some aspects, one or more plates of the plate assembly 50 may comprise stamped sheet metal. An operator pad 54 is coupled on the rearward facing surface of the plate assembly 50, against which an operator may lean during operation of the mower 10. Rearward of the control tower 48 is an operator platform 52 on which an operator may stand during operation of the mower 10.

A rearward grab bar 58 may be fixed to the top of the control tower 48. In aspects, an operator may grasp the rearward grab bar 58 during operation of the mower 10. Also mounted to the top of the control tower 48 are a first steering lever 60 and a second steering lever 62. The first steering lever 60 and the second steering lever 62 are each independently, pivotally mounted to the control tower 48. The first steering lever 60 may be configured to control the operation of a right drive wheel 18 and the second steering lever 62 may be configured to control the operation of a left drive wheel 18. For example, the first steering lever 60 may pivot forwardly to initiate forward propulsion of the right drive wheel and may pivot rearwardly to initiate rearward propulsion of the right drive wheel. The second steering lever 62 may operate in the same manner with regard to the left drive wheel 18. The amount of rotation of the first steering lever 60 and the second steering lever 62 may generate a proportional amount of propulsion, such that the greater the rotation the greater the propulsion generated.

One or more additional controls may also be coupled to the control tower 48. For example, a power takeoff switch 66 may be coupled to the control tower 48 configured for controlling a supply of power to the deck motors 24. A keyed switch 68 may also be coupled to the control tower 48 and configured for energizing the mower 10 when a key is received and engaged therein.

Forward of the first steering lever 60 and the second steering lever 62 is a blocking bar 70. The blocking bar 70 is pivotally coupled to the control tower 48 and pivots about an axis extending in a lateral direction of the mower 10. Pivotally coupled to the blocking bar 70 is a locking bar 72. The locking bar 72 also pivots about an axis extending in a lateral direction of the mower 10. The locking bar 72 engages a locking bracket 74. The locking bracket 74 is coupled to the control tower 48. These features are more easily seen in FIGS. 2 and 3 where much of the mower 10 has been hidden for sake of clarity.

Figure 2:
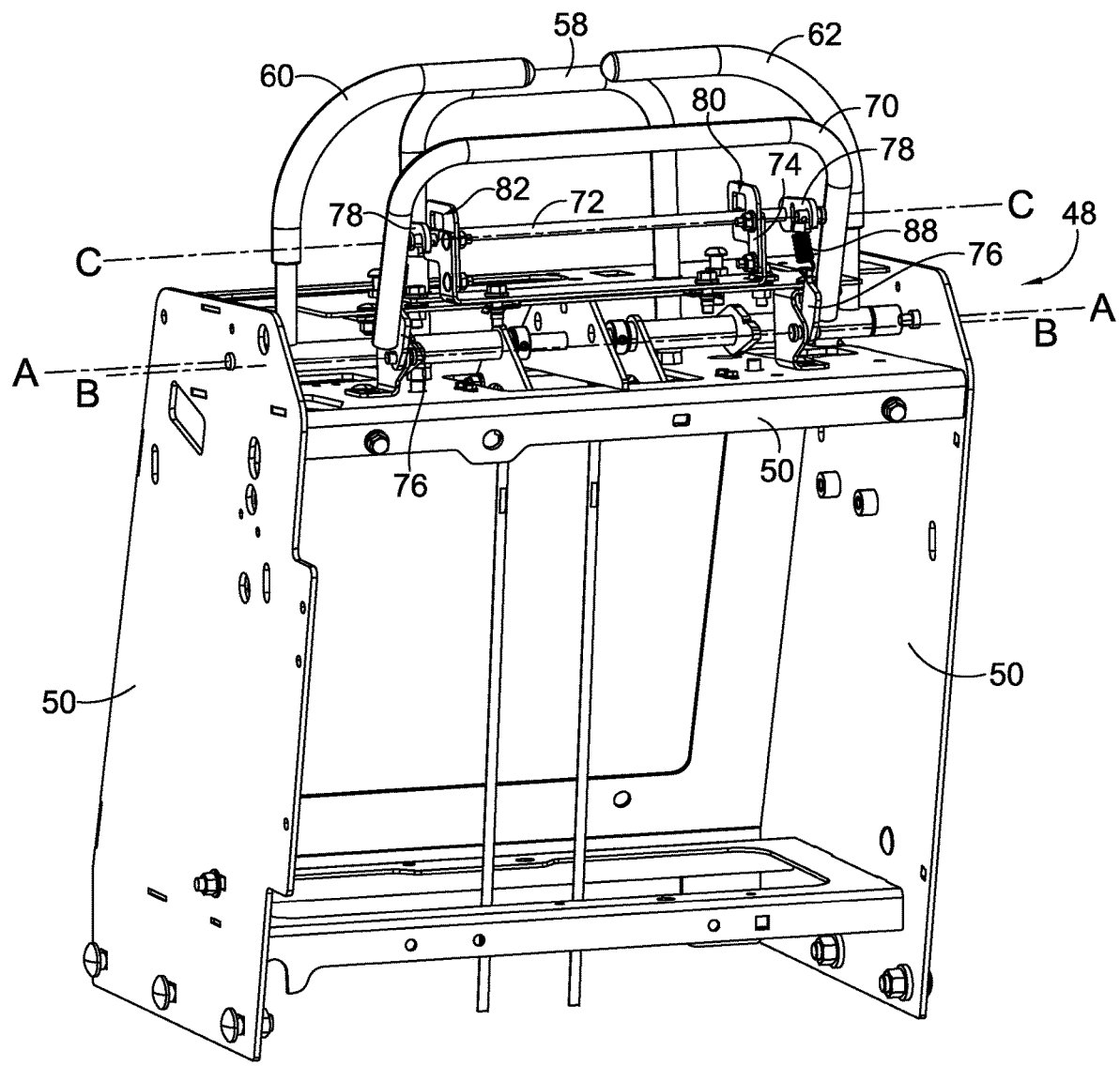
FIG. 2 depicts a perspective view of a portion of a control tower of the terrain working vehicle of FIG. 1, in accordance with aspects hereof.
Figure 3:
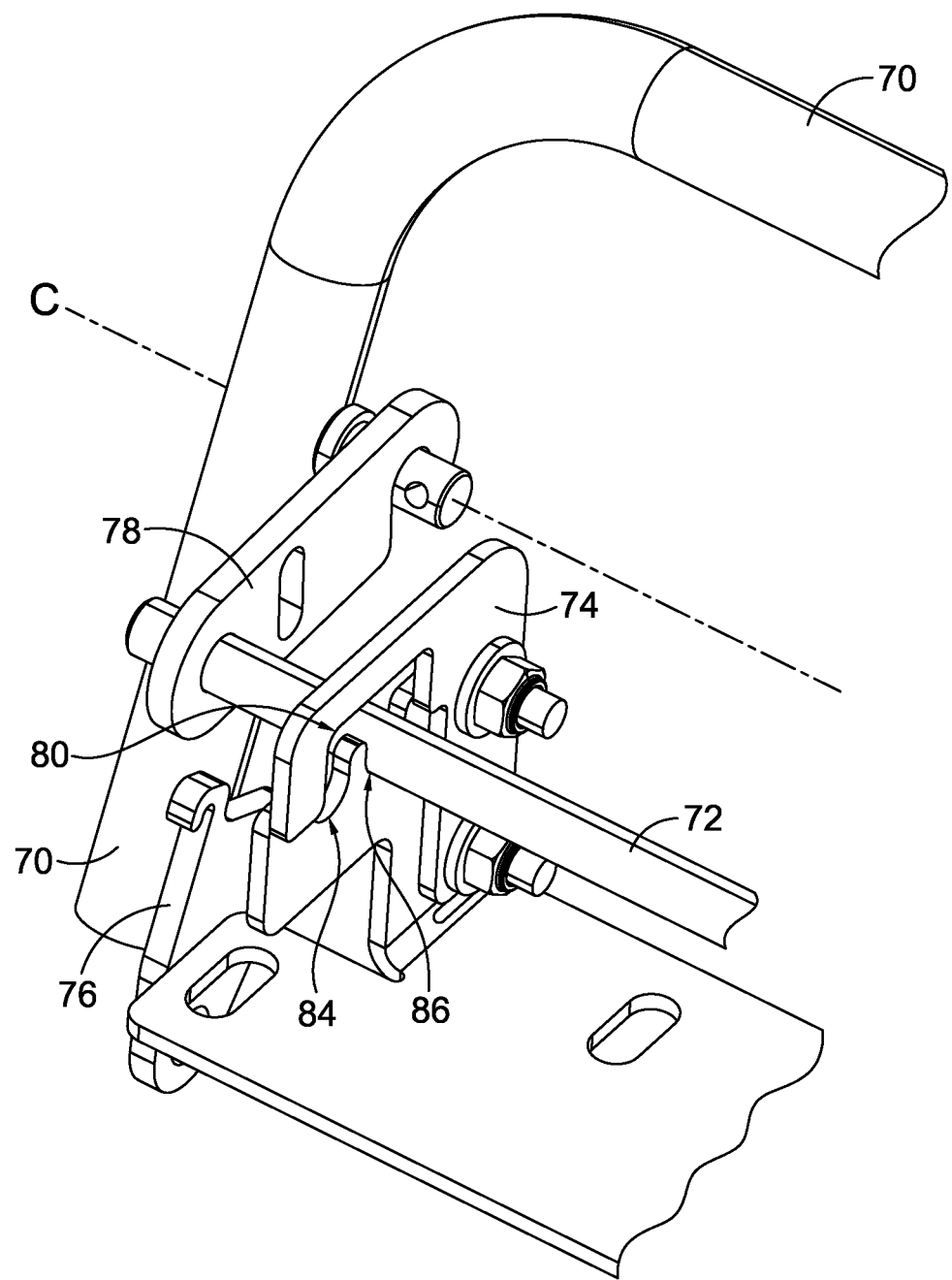
FIG. 3 depicts a section view of a portion of the terrain working vehicle of FIG. 1, in accordance with aspects hereof.

Referring to FIGS. 2 and 3, the first steering lever 60 and the second steering lever 62 pivot around lateral axis A. Forward of lateral axis A, is lateral axis B about which the blocking bar 70 pivots. Radially out (and upward in the figure) from lateral axis B is lateral axis C about which the locking bar 72 pivots. The blocking bar 70 is depicted as a "U" shape rod affixed to flanges 76 on either end. The flanges 76 are each pivotally coupled to the control tower 48 so as to pivot about lateral axis B, one proximate a right side of mower 10 and the other proximate a left side of mower 10. In some aspects, the blocking bar 70 and the flanges 76 may be integral to one another. The locking bar 72 comprises a rod and includes flanges 78 that extend from either end of the rod. The flanges 78 are pivotally coupled to the blocking bar 70 so as to pivot about lateral axis C, one proximate a right side of the blocking bar 70 and one proximate a left side of the blocking bar 70. The locking bracket 74 is comprised of a plurality of formed sheet metal components affixed to one another and coupled to the control tower 48. In some aspects, the locking bracket 74 may comprise a unitary structure. The locking bracket 74 includes a left aperture 80 and a right aperture 82, which are laterally aligned with one another. Each of the left aperture 80 and the right aperture 82 include a first notch 84 and a second notch 86. The second notch 86 is forward of the first notch 84 in a longitudinal direction of the mower 10. Other aspects may include more than two notches in the locking bracket 74. The notches 84, 86 provide an engagement portion for the locking bar 72 to engage the locking bracket 74. Although depicted as apertures in the illustrated aspect, other aspects may include channels open on one or more sides which include the notches described above. A pair of tension springs 88 bias the locking bar 72 downward to promote seating engagement with at least one of the notches 84, 86.

Using the blocking bar 70, the forward propulsion of the mower 10 may be limited to less than full speed (e.g., less than full throttle position, less than full hydrostatic drive configuration, less than full voltage supply). This may be accomplished by moving the blocking bar 70 from an unblocking position (e.g., shown in FIGS. 1-4) into a blocking position (e.g., shown in FIG. 5). In the blocking position the blocking bar 70 presents a physical obstruction past which the first steering lever 60 and the second steering lever 62 cannot pass. The blocking bar 70 is in the blocking position when the locking bar 72 is engaged with the first notch 84. The blocking bar 70 is in the unblocking position when the locking bar is engaged with the second notch 86. In the unblocking position, the blocking bar 70 does not interfere with the path of travel of the first steering lever 60 and the second steering lever 62. In alternative aspects, the locking bracket 74 may include additional notches which may permit the blocking bar 70 to provided varied levels of obstruction to the first steering lever 60 and the second steering lever 62. Stated another way, in these alternative embodiments the forward propulsion of the mower 10 may be limited to different speeds that are each less than full speed.

Having the locking bar 72 biased into engagement with the locking bracket 74 as described above allows an operator of the mower 10 to make on-the fly adjustment to the blocking bar 70. For example, the operator grasping the first steering lever 60 and the second steering lever 62 may maintain their grip on said levers while also reaching the locking bar 72 with their fingers. The operator may then raise the locking bar 72 and move it to engage the other of the notches 84, 86. In this way, the blocking bar 70 may move between the blocking position and the unblocking position while the mower 10 is operated. At the same time, engaging the locking bar 72 in the manner described above provides a blocking bar 70 that can also provide a solid gripping structure for the operator to grasp during operation of the mower 10. In other words, the blocking bar 70 serves as an adjustable forward grab bar that an operator may grasp similar to the rearward grab bar 58 (which is immovable in aspects). Thus, an operator may utilize the blocking bar 70 to brace against while operating the mower 10. This can be advantageous for long, continuous operation of the mower 10. The steering levers 60, 62 are biased towards the neutral position and an operator must overcome this force during operation of the mower 10, which can become tiring to the operator over extended use. Grasping the rearward grab bar 58 or the blocking bar 70 helps the operator avoid this type of fatigue.

Figure 4:
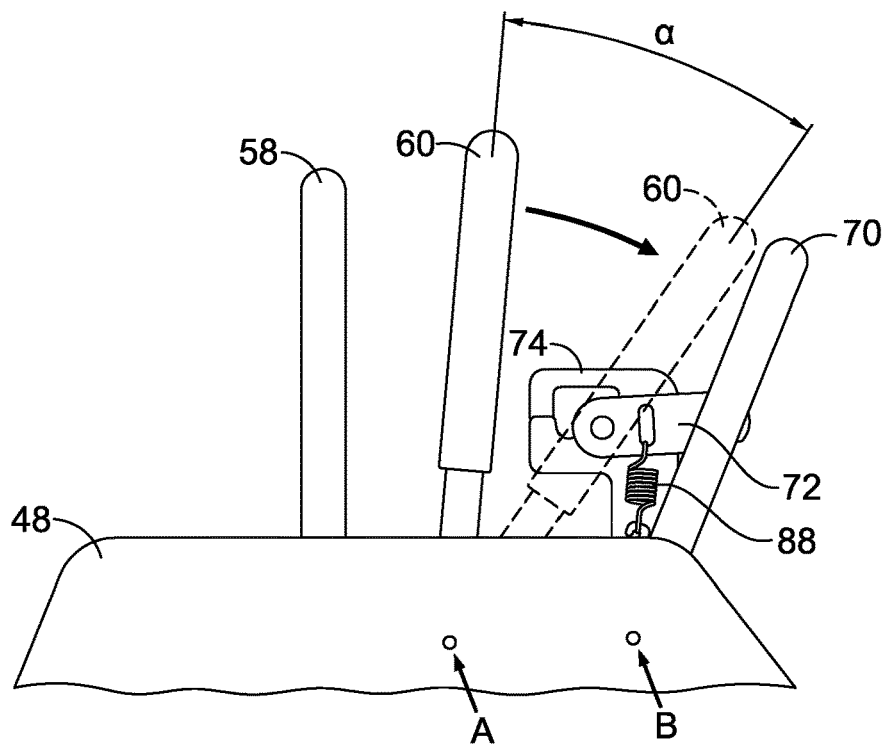
FIG. 4 depicts a right side view of the control tower of the terrain working vehicle of FIG. 1 with a blocking bar in an unblocking position, in accordance with aspects hereof.
Figure 5:
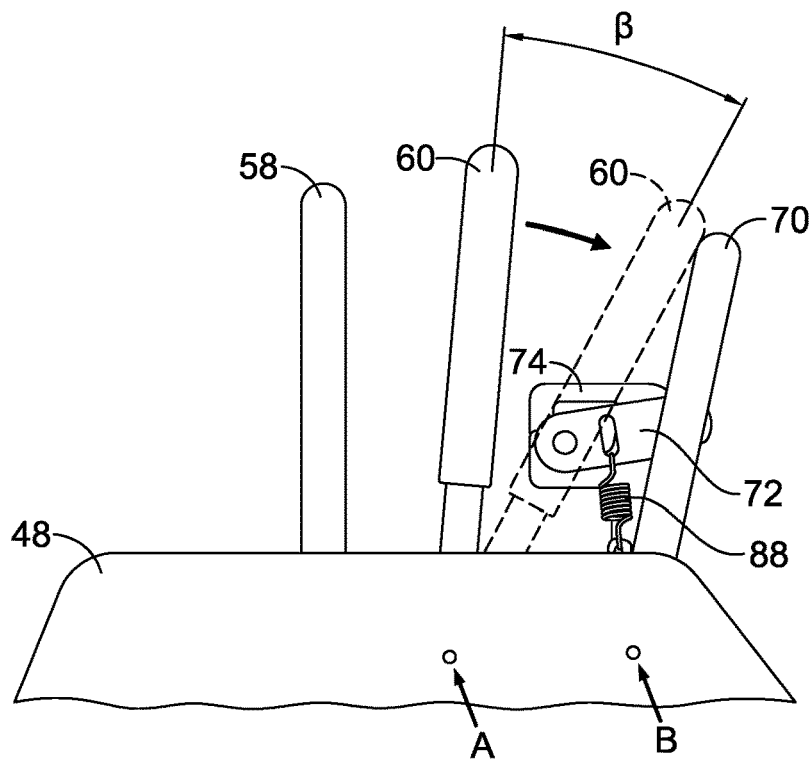
FIG. 5 depicts a right side view of the control tower of the terrain working vehicle of FIG. 1 with the blocking bar in a blocking position, in accordance with aspects hereof.

Referring to FIGS. 4 and 5, the mower 10 is viewed from a right side. In FIG. 4, the blocking bar 70 is in the unblocking position. As a result, the first steering lever 60 can pivot about axis A between a first position (shown in solid lines) and a second position (shown in dashed lines). Between the first position and the second position, the first steering lever 60 rotates an angle α. In FIG. 5, the blocking bar 70 is in the blocking position. Here, the first steering lever 60 can only pivot about axis A between the first position (shown in solid lines) and a third position (shown in dashed lines) that is intermediate to the first and second positions. Once the first steering lever 60 reaches the third position the blocking bar 70 physically prevents it from reaching the second position. As a result, between the first position and the third position, the first steering lever 60 only rotates an angle β, which is less than angle α. Although only the first steering lever 60 is shown in FIGS. 4 and 5 and described above, the same description applies to aspects having a second steering lever 62. For example, in aspects of a ZTR mower where the first steering lever 60 and the second steering lever 62 control both the speed of the ZTR mower and the directional steering of the mower, the blocking bar 70 provides a common limiting process applied to both levers.

In some aspects, it may be desirable to keep the blocking bar 70 in the blocking position. In these aspects, a locking assembly may be utilized. The locking assembly may hold the blocking bar 70 in the blocking position by preventing movement of the blocking bar 70 (e.g., rotation around axis B) or by preventing movement of locking bar 72 (e.g., rotation around axis C). For example, a lock (e.g., a padlock) may be threaded through an aperture in the locking bar 72 and a portion of the locking bracket 74 or the control tower 48. The locking assembly may provide a way for an owner of a mower to limit operation of the mower to lower speeds by locking out changes to the positioning of the blocking bar 72.

In alternative aspects, the mower may include a blocking bar that is actuated. For example, the blocking bar could be actuated with an electric actuator, a pneumatic actuator, a hydraulic actuator, a mechanical actuator, or some other actuator. The actuator of these aspects may move the blocking bar between the blocking position and the unblocking position. In some of these aspects, the actuator may hold the blocking bar in the blocking position or the unblocking position and the locking bar and the locking bracket may be omitted. In addition, some of these aspects include an actuator that can move the blocking bar to one or more positions intermediate to the blocking position and the unblocking position. For example, an actuator may move the blocking bar to any point between the blocking position and the unblocking position, which may allow an owner of a mower flexibility in setting an upper limit for operational speed for the mower. The actuator may be controlled, in accordance with some aspects, with controls located on or proximate to the steering levers. For example, buttons, switches, handles, or other input devices may be coupled to the steering levers to allow control of the actuator during operation of the mower. In still other aspects, a control system of the mower (e.g., a controller) may include programmable logic that permits an owner of the mower to limit the positions the blocking bar may be actuated to. For example, the owner of the mower may be able to set an upper limit for speed based upon limiting the blocking bar to move between the blocking position and a second blocking position that is between the blocking position and the unblocking positions. This results in the blocking bar not being able to reach the unblocking position to thus limit the operational speed for the mower.

A method of engaging the blocking bar (e.g., blocking bar 70) may comprise a step of raising the locking bar (e.g., locking bar 72) out of the second notch (e.g., second notch 86) such that the locking bar (e.g., locking bar 72) is disengaged from the locking bracket (e.g., locking bracket 74). Following disengaging the locking bar (e.g., locking bar 72) from the locking bracket (e.g., locking bracket 74), a step of repositioning the locking bar (e.g., locking bar 72) into seated engagement with the first notch (e.g., first notch 84). Repositioning the locking bar (e.g., locking bar 72) results in repositioning the blocking bar (e.g., blocking bar 70) into the blocking position from the unblocking position. In accordance with aspects, this method may be performed while the STV is being driven because the operator can perform this method without having to remove a hand from either of the steering levers. In other words, the method can be performed without having to return the steering lever(s) to a neutral condition and without having to turn the vehicle off.

A method of disengaging the blocking bar (e.g., blocking bar 70) may comprise a step of raising the locking bar (e.g., locking bar 72) out of the first notch (e.g., second notch 84) such that the locking bar (e.g., locking bar 72) is disengaged from the locking bracket (e.g., locking bracket 74). Following disengaging the locking bar (e.g., locking bar 72) from the locking bracket (e.g., locking bracket 74), a step of repositioning the locking bar (e.g., locking bar 72) into seated engagement with the second notch (e.g., first notch 86). Repositioning the locking bar (e.g., locking bar 72) results in repositioning the blocking bar (e.g., blocking bar 70) into the unblocking position from the blocking position. In accordance with aspects, this method may be performed while the STV is being driven because the operator can perform this method without having to remove a hand from either of the steering levers. In other words, the method can be performed without having to return the steering lever(s) to a neutral condition and without having to turn the vehicle off.

Additionally, although some exemplary implementations of the embodiments described herein are shown in the accompanying figures, these implementations are not intended to be limiting. Rather, it should be understood that the various embodiments and aspects described herein may be implemented upon any mower having a cutting deck suspended therefrom.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

What is claimed:

1. A stand-on terrain working vehicle comprising:
    a control tower;
    a steering lever pivotally coupled to the control tower, the steering lever configured to move between a first position and a second position;
    a blocking bar pivotally coupled to the control tower, the blocking bar configured to move between a blocking position and an unblocking position;
    a locking bar pivotally coupled to the blocking bar; and
    a locking bracket coupled to the control tower, the locking bracket having a first engagement portion and a second engagement portion, wherein the locking bar is configured to selectively engage the locking bracket at one of the first engagement portion and the second engagement portion,
    wherein the blocking bar, when in the blocking position, obstructs full movement of the steering lever between the first position and the second position and, when in the unblocking position, does not obstruct movement of the steering lever between the first position and the second position,
    wherein the locking bar engages the locking bracket at the first engagement portion when the blocking bar is in the blocking position and the locking bar engages the locking bracket at the second engagement portion when the blocking bar is in the unblocking position.

2. The stand-on terrain working vehicle of claim 1 further comprising:
    a second steering lever pivotally coupled to the control tower, the second steering lever configured to move between a third position and a fourth position,
    wherein the blocking bar, when in the blocking position, obstructs full movement of the second steering lever between the third position and the fourth position and, when in the unblocking position, does not obstruct movement of the second steering lever between the third position and the fourth position.

3. The stand-on terrain working vehicle of claim 1, wherein the first engagement portion comprises a first pair of laterally aligned notches formed in the locking bracket and the second engagement portion comprises a second pair of laterally aligned notches formed in the locking bracket.

4. The stand-on terrain working vehicle of claim 3 further comprising a biasing mechanism configured to bias the locking bar into seated engagement with one of the first pair of laterally aligned notches and the second pair of laterally aligned notches.

5. The stand-on terrain working vehicle of claim 4, wherein the biasing mechanism comprises a first tension spring and a second tension spring, said tension springs coupled between laterally opposing sides of the locking bar and the control tower.

6. The stand-on terrain working vehicle of claim 1 further comprising a plurality of intermediate engagement portions positioned between the first engagement portion and the second engagement portion.

7. The stand-on terrain working vehicle of claim 1, wherein each of the steering lever, the blocking bar, and the locking bar pivot around laterally extending, parallel axes.

8. The stand-on terrain working vehicle of claim 1 further comprising:
    a linkage coupled between the steering lever and a propulsion system of the vehicle, wherein movement of the steering lever between the first position and the second position adjusts an input to the propulsion system to adjust propulsion of the vehicle.

9. The stand-on terrain working vehicle of claim 8, wherein the propulsion system comprises a hydrostatic drive system and movement of the steering lever between the first position and the second position adjusts a position setting of a hydrostatic pump swash plate.

10. The stand-on terrain working vehicle of claim 8, wherein the propulsion system comprises an internal combustion drive system and movement of the steering lever between the first position and the second position adjusts a throttle setting of an internal combustion engine.

11. The stand-on terrain working vehicle of claim 8, wherein the linkage comprises a push-pull cable assembly.

12. The stand-on terrain working vehicle of claim 1 further comprising:
    a position measuring device coupled to the control tower, the position measuring device configured to detect a current position of the steering lever;
    a control system configured to receive an indication of the current position of the steering lever from the position measuring device, and based upon the current position of the steering lever the control system instructs a propulsion setting be set at a propulsion system of the vehicle.

13. The stand-on terrain working vehicle of claim 12, wherein the propulsion system comprises a hydrostatic drive system and the propulsion setting comprises a position setting of a hydrostatic pump swash plate.

14. The stand-on terrain working vehicle of claim 12, wherein the propulsion system comprises an electric drive system and the propulsion setting comprises a voltage supplied to an electric motor.

15. A stand-on terrain working vehicle comprising:
    a control tower;
    a steering lever pivotally coupled to the control tower, the steering lever configured to move between a first position and a second position;
    a blocking bar pivotally coupled to the control tower, the blocking bar configured to move between a blocking position and an unblocking position;
    wherein the blocking bar, when in the blocking position, limits movement of the steering lever from the first position to an intermediate position, the intermediate position being between the first position and the second position, wherein the blocking bar, when in the unblocking position, does not limit movement of the steering lever between the first position and the second position.

16. The stand-on terrain working vehicle of claim 15 further comprising:

a locking bar pivotally coupled to the blocking bar; and a locking bracket coupled to the control tower, the locking bracket having a first engagement portion and a second engagement portion, wherein the locking bar is configured to selectively engage the locking bracket at one of the first engagement portion and the second engagement portion, wherein the locking bar engages the locking bracket at the first engagement portion when the blocking bar is in the blocking position and the locking bar engages the locking bracket at the second engagement portion when the blocking bar is in the unblocking position.

17. The stand-on terrain working vehicle of claim 15 further comprising:

a second steering lever pivotally coupled to the control tower, the second steering lever configured to move between a third position and a fourth position, wherein the blocking bar, when in the blocking position, limits movement of the second steering lever from the third position to a second intermediate position, the second intermediate position being between the third position and the fourth position, wherein the blocking bar, when in the unblocking position, does not limit movement of the steering lever between the third position and the fourth position.

18. The stand-on terrain working vehicle of claim 17, wherein the intermediate position of the steering lever and the second intermediate position of the second steering lever are radially aligned to one another and correspond with the point at which the steering lever and the second steering lever, respectively, contact the blocking bar.

* * * * *